(12) United States Patent
Dysart et al.

(10) Patent No.: US 6,708,166 B1
(45) Date of Patent: Mar. 16, 2004

(54) METHOD AND APPARATUS FOR STORING DATA AS OBJECTS, CONSTRUCTING CUSTOMIZED DATA RETRIEVAL AND DATA PROCESSING REQUESTS, AND PERFORMING HOUSEHOLDING QUERIES

(75) Inventors: Andrew Dysart, Stamford, CT (US); Norbert Hom, Saddle River, NJ (US); Kevin Barron, Maplewood, NJ (US); Richard Flynn, Maryland Heights, MO (US); Paraic O'Connor, Woodside, NY (US); Byran Craig, Maryland Heights, MO (US); Kan Moy, Whitestone, NY (US); Michael Zwolak, Greenwich, CT (US)

(73) Assignee: Norbert Technologies, LLC, Stamford, CT (US)

( * ) Notice: Subject to any disclaimer, the term of this patent is extended or adjusted under 35 U.S.C. 154(b) by 0 days.

(21) Appl. No.: 09/568,502

(22) Filed: May 11, 2000

(Under 37 CFR 1.47)

Related U.S. Application Data

(60) Provisional application No. 60/133,675, filed on May 11, 1999.

(51) Int. Cl.[7] ............................................. G06F 17/30
(52) U.S. Cl. ........................... 707/6; 707/3; 707/104.1; 707/102; 707/5
(58) Field of Search ................................ 707/2, 3, 5, 6, 707/202, 4, 101, 102, 1, 104.1; 700/29, 108; 382/190, 198

(56) References Cited

U.S. PATENT DOCUMENTS

| | | | | |
|---|---|---|---|---|
| 4,974,191 A | * | 11/1990 | Amirghodsi et al. | 704/8 |
| 5,454,106 A | * | 9/1995 | Burns et al. | 707/4 |
| 5,642,502 A | * | 6/1997 | Driscoll | 707/5 |
| 5,717,913 A | * | 2/1998 | Driscoll | 707/5 |
| 5,761,663 A | | 6/1998 | Lagarde et al. | 707/10 |
| 5,764,974 A | * | 6/1998 | Walster et al. | 707/6 |
| 5,787,411 A | | 7/1998 | Groff et al. | 707/2 |
| 5,787,412 A | | 7/1998 | Bosch et al. | 707/2 |
| 5,787,425 A | | 7/1998 | Bigus | 707/6 |
| 5,857,197 A | | 1/1999 | Mullins | 707/103 |
| 5,864,844 A | | 1/1999 | James et al. | 707/4 |
| 5,963,942 A | * | 10/1999 | Igata | 707/6 |
| 6,026,398 A | * | 2/2000 | Brown et al. | 707/5 |
| 6,073,130 A | * | 6/2000 | Jacobson et al. | 707/5 |
| 6,078,914 A | * | 6/2000 | Redfern | 707/3 |
| 6,105,023 A | * | 8/2000 | Callan | 707/5 |
| 6,185,560 B1 | * | 2/2001 | Young et al. | 707/6 |
| 6,385,602 B1 | * | 5/2002 | Tso et al. | 707/3 |
| 6,397,211 B1 | * | 5/2002 | Cooper | 707/3 |

* cited by examiner

Primary Examiner—Jean R. Homere
Assistant Examiner—Leslie Wong
(74) Attorney, Agent, or Firm—Merchant & Gould

(57) ABSTRACT

Compressed data objects are stored in a remote data store and are accessible to end users for data retrieval and processing. Descriptive information about data objects and processing logic is displayed and made available for viewing and access by end users having a client application which manipulates the descriptive information to create a customized data retrieval and processing request. The request can be submitted to several data stores in succession for automated data retrieval and processing without jeopardizing request security. The final request is submitted to the appropriate data store(s) and/or vendor(s) for automated processing in accordance with the customized instructions, and the data result set is returned in a format specified by the end user. Householding capability and security features are available. End users can customize their householding parameters, including end user specifications to improve flexibility, speed, and efficiency of the householding process.

6 Claims, 6 Drawing Sheets

METHOD AND APPARATUS FOR STORING DATA AS OBJECTS, CONSTRUCTING CUSTOMIZED DATA RETRIEVAL AND DATA PROCESSING REQUESTS, AND PERFORMING HOUSEHOLDING QUERIES

This application claims the benefit of U.S. provisional patent application No. 60/133,675, filed May 11, 1999.

FIELD OF THE INVENTION

The invention relates to the field of databases, in particular, to data storage and data compression, and to technology for searching and retrieving data from a data store. The invention also relates to performing householding queries on end user data.

BACKGROUND OF THE INVENTION

There are many existing methods for constructing database queries, searching databases remotely, and retrieving search results. For example, U.S. Pat. No. 5,857,197 (Mullins Jan. 5, 1999) entitled "SYSTEM AND METHOD FOR ACCESSING DATA STORES AS OBJECTS" describes, according to the Abstract, a system and a method for accessing a data store as objects from an object application. The accessed data store can be either an object data store or a non-object (e.g. relational) data store. The system includes an object schema including meta data corresponding to a data store schema and an adapter abstraction layer. The adapter abstraction layer comprises a first adapter, and a second adapter. One embodiment of the system includes an object schema manager to create and maintain the object schema at run time. It comprises a dynamic, scalable, centrally managed, and secure method for accessing data stored in both object and non-object (e.g. relational) data stores, effecting a consistent interface to the data store regardless of its underlying structure, or a method of transport and level of security.

U.S. Pat. No. 5,787,411 (Groff et al. July 28, 1998) entitled "METHOD AND APPARATUS FOR DATABASE FILTER GENERATION BY DISPLAY SELECTION" describes, according to the Abstract, a method for selecting records from a displayed database table by generating an SQL SELECT command for filtering the displayed records in accordance with cell values highlighted by user input. A presently selected set of records from a desired table (generally referred to as a record set or record source) are displayed on the user's display screen. The user selects particular values in cells (an intersection of a row and a column of the displayed table) by highlighting the values using the pointer device or keyboard of the computer system. Methods of the present invention then generate an SQL select (filter) command to selectively retrieve those records from the displayed records which match the user's highlighted values. A fully highlighted cell indicates exact equality is desired by the user, a beginning portion highlighted indicates that the user wishes to match records whose corresponding column starts with the highlighted value, and ending portion selection matches the ending portion of qualified records, and a middle portion highlighted matches any record containing the highlighted value. Values highlighted in the same row generate logically AND'd clauses in the SELECT command while the comparison generated for a row are logically OR'd with the comparisons generated for other rows. The user may indicate that the highlighted values are for selection (inclusion of qualified records) or for exclusion selection (exclusion of qualified records). A new select (filter) command may be logically AND'd with the prior filter to permit complex selection criteria to be defined by simple graphical user inputs.

U.S. Pat. No. 5,864,844 (James et al. Jan. 26, 1999) entitled "SYSTEM AND METHOD FOR ENHANCING A USER INTERFACE WITH A COMPUTER BASED TRAINING TOOL" describes, according to the Abstract, a method for enhancing a user interface with a computer based training tool comprising the steps of listing domain objects on a display; listing domain object values in response to a selection of one of the domain objects; generating a plurality of inquiries in response to a user selection of one of the domain object values; replying with a predetermined answer; identifying a new domain object value in the predetermined answer; and adding to the plurality of inquiries a new inquiry which incorporates both the selected domain object value and the new domain object value.

U.S. Pat. No. 5,787,412 (Bosch et al. Jul. 28, 1998) entitled "OBJECT ORIENTED DATA ACCESS AND ANALYSIS SYSTEM" describes, according to the Abstract, a system for accessing and analyzing data through a central processing unit. The system includes a non-modal user interface to provide a user access to the system. A number of application graphics objects allow the user to visually interact with a plurality of analysis objects through the non-modal user interface. The plurality of application analysis objects allow a user to interactively create an analysis network for analyzing one or more databases. A plurality of application data access objects automatically interprets the analysis network and allows the system to access required databases and to generate structure query language required to access and analyze the databases as defined within the analysis network.

U.S. Pat. No. 5,787,425 (Bigus Jul. 28, 1998) entitled "OBJECT-ORIENTED DATA MINING FRAMEWORK MECHANISM" describes, according to the Abstract, an object oriented framework for data mining operates upon a selected data source and produces a result file. Certain core functions are performed by the framework, which interact with the extensible function. This separation of core and extensible functions allows the separation of the specific processing sequence and requirement of a specific data mining operation from the common attribute of all data mining operations. The user may thus define extensible functions that allow the framework to perform new data mining operations without the framework having the knowledge of the specific processing required by those operations.

U.S. Pat. No. 5,761,663 (Lagarde et al. Jun. 2, 1998) entitled "METHOD FOR DISTRIBUTED TASK FULFILLMENT OF WEB BROWSER REQUESTS" describes, according to the Abstract, a World Wide Web browser which makes requests to web servers on a network which receive and fulfill requests as an agent of the browser client, organizing distributed sub-agents as distributed integration solution (DIS) servers on an intranet network supporting the web server which also has an access agent servers accessible over the Internet. DIS servers execute selected capsule objects which perform programmable functions upon a received command from a web server control program agent for retrieving, from a database gateway coupled to a plurality of database resources upon a single request made from a Hypertext document, requested information from multiple data bases located at different types of databases geographically dispersed, performing calculations, formatting, and other services prior to reporting to the web browser or to other locations, in a selected format, as in a display, fax, printer, and to customer installations or to TV video subscribers, with account tracking.

However, there is a need for a substantial improvement in the efficiency of several data-intensive industries. For example, the credit industry currently requires an average of at least thirty days to respond to a customer request for information necessary to execute a pre-approved credit card mailing. Typically, a customer wishing to execute such a mailing will send the credit company a sample of the types of households to which the customer would like to send its mailing, which sample includes records containing specific addresses, account numbers, household incomes, and other household information. Because of the size of the sample, the records are generally sent on magnetic tape, which, as is well known, entails handling, transportation and storage costs and delays inherent in physical transportation. The customer also typically sends specifications for supplementing this sample data with data from the credit company data store in order to compile a complete mailing list for the offer.

The specifications might request that the data store identify 20,000 households in the same zip codes and income ranges as the households provided in the sample. The specifications might also request that once these households are identified, the data store run its own logic on this data to determine the creditworthiness of each household contained therein (a "FICA score") and return only those households with a FICA score of an acceptable level.

Finally, the specifications will specify the layout in which the customer would like to receive the finished report. Customer specifications may be significantly more complex than this example which has been simplified for the purposes of explanation.

Upon receiving the request, the credit company must allocate resources to analyze customer specifications and ensure that it correctly understands the customer's needs and that the data that has been provided. Miscommunication between the credit company and the customer can lead to costly errors and reruns, particularly as requests become more sophisticated.

Once the credit company believes that it understands the specifications, it will often be required to write custom software code in order to standardize the records provided by the customer (which may contain a variety of record formats and types) so that they will interface with the data store's standard processing operation. Preparing custom code for each customer requires large numbers of programmers and time consuming data analysis, as can readily be appreciated.

Upon completion of the analysis, the credit company will run its proprietary FICA score logic on the results and may run "householding" logic to show relationships among different individuals sharing the same address, or to identify and eliminate redundant information. Large portions of the householding process are generally "hard coded" in advance, making it difficult to adjust householding parsing and matching parameters to the particular data received or the end user's particular needs. As a result, data may be mismatched and relationships among records may be undiscovered. Furthermore, householding large files often takes days or weeks to complete because large files and cumbersome parsing and matching procedures slow the process and prevent the efficient use of system memory.

Once processing is completed, custom code is then written to provide the results in the customer's preferred layout. Upon completion of the process, the credit company will likely return the results on magnetic tape because the volume of the data prohibits electronic transmission. This entire process may take one month or more, excluding reruns if there are miscommunications or mistakes at any stage of the process.

Therefore, a need exists for improvements in the area of database construction, queries, householding, and remote searching.

SUMMARY OF THE INVENTION

It is, therefore, a principle object of this invention to provide a method and apparatus for storing data as objects, constructing customized data retrieval and data processing requests, and performing householding queries.

It is another object of the invention to provide a method and apparatus that solves the above mentioned problems so that database efficiency can be improved.

These and other objects of the present invention are accomplished by the method and apparatus disclosed herein.

Advantageously, according to an aspect of the invention, a universal data object (UDO) is provided. A universal data object is a combination of data and function/logical processing instructions used to perform a particular database search request and to execute customized processing instructions on the results of that request. Each universal data object consists of two distinct sections: (i) one or more data object headers and (ii) raw data. The universal data object is compressed at practically all stages of operation. The universal data object may include, but is not limited to, extended binary coded decimal interchange code (EBCDIC—an IBM® system 360/370, 256 character code with 11 bits per character) and variable length files put in a standardized format, and an index of the compressed data. The invention provides for automated extraction of data object headers and capture of data profile statistics.

According to an aspect of the invention, the user builds a fully executable processing request, not mere specifications for a request.

According to an aspect of the invention, a universal data object carries large amounts of data married to processing instructions.

According to one aspect of the invention, the universal data object remains compressed at nearly all times.

According to an aspect of the invention, compressed universal data objects are stored in a flexible data store and are accessible to remote end users for data retrieval and processing.

According to an aspect of the invention, during compression, the data store is optimized for efficient data storage and retrieval by capturing data profile statistics and creating an index of the compressed data.

According to an aspect of the invention, descriptive information about universal data objects and processing logic is displayed and made available for viewing and access by remote end users having access to a client application.

According to an aspect of the invention, the client application manipulates the descriptive information to create a customized data retrieval and processing request.

According to an aspect of the invention, an end user can add descriptive information about its own data to the request and attach its own compressed data to the request so that it will be included in data retrieval and processing.

According to an aspect of the invention, descriptive information representing data and logic stored in multiple remote data stores can be integrated into one request.

According to an aspect of the invention, the request can be submitted to several data stores in succession for automated data retrieval and processing without jeopardizing request security.

According to an aspect of the invention, the final, customized request object, therefore, may contain: (i) descriptive information identifying data; (ii) descriptive information identifying logic to be executed on the data; and (iii) compressed end user data.

According to an aspect of the invention, the final request is submitted to the appropriate data store(s) and/or vendor(s) for automated processing in accordance with the customized instructions, and the data result set is returned in a format specified by the end user.

According to an aspect of the invention, the contents of the data store and the request can be almost completely processed entirely in their compressed form.

According to an aspect of the invention, a method of performing householding queries comparing input data with reference lists to produce data output is described, the method comprising building input patterns from data input submitted by an end user, displaying the input data for viewing by an end user utilizing a graphical user interface (GUI), allowing the end user to construct an output table containing output table symbols, mapping the input patterns to the output table symbols, mapping the output table symbols to a reference list, generating search patterns derived from the mapping of input patterns to the output table symbols that are mapped to the reference list, and using the search patterns to parse the data input against the reference lists to produce data output.

According to another aspect of the invention, end users have broad flexibility in customizing their householding parameters, including end-user specifications to improve the flexibility, speed and efficiency of the householding process. End user householding specifications are entered through the invention's GUI, which allows end users to review summary information about their data and specify the data parsing (i.e., data cleansing and classifying) procedures that they wish the invention to perform. End users can access and use the GUI to tailor householding parameters to accommodate their parsing requirements. For example, an end user can tailor parsing parameters to ensure that non-traditional data inputs, such as data from different countries or different systems, are correctly parsed.

According to another aspect of the invention, householding speed and efficiency are improved by using the information entered by the end user to prioritize parsing operations and eliminate unnecessary processing. Specialized, indexed parsing tables are created in memory to further increase the speed of the parsing process. These parsing tables are designed to maximize use of system memory, thus eliminating extensive I/O exchanges that slow traditional householding processes.

Advantageously, the present invention automates the existing process to a degree that was previously impossible. Data stored in the credit company data store, such as was described above, and is transformed into standardized, compressed data objects according to an aspect of the invention.

According to an aspect of the invention, the universal data object is optimized for data storage and retrieval with methods for automatically capturing and displaying data profile statistics and storing data in indexed, compressed blocks that facilitate rapid data retrieval.

According to an aspect of the invention, the credit company data store is provided with a method for creating an electronic display of its data, data profile statistics, and data processing logic, which display is made available to customers.

According to an aspect of the invention, a customer accesses this displayed information and uses a GUI that generates an application programming language ("APL") to construct an executable request for data retrieval and data processing from this displayed information.

According to an aspect of the invention, information about the customer's data can be integrated into the request, and the customer's own compressed data can be attached to the request so that it will be automatically processed at the data store.

According to an aspect of the invention, the request (including customer data, if any) is submitted to the data store electronically, and the request is executed in accordance with the APL instructions.

According to an aspect of the invention, once the customer builds and sends the request, the entire process is automated and performed on compressed data, with almost no expanding of data at any time during the process, unless it is passed to an external C program, householding, or other program that requires uncompressed data.

According to an aspect of the invention, a compressed result set is automatically returned to the customer in a layout specified by the customer on the GUI.

Thus, the invention dramatically improves the efficiency of the current process. Advantageously,because the customer can review the entire range of data and logic options made available by the data store and construct its own request, the data store does not need to interpret customer specifications or take responsibility for miscommunications. Instead, the customer can visit the credit company's Internet site and choose the household zip codes and income categories necessary for its request by double-clicking on the credit company display.

The customer can also double-click on available logic, such as FICA score, and use the GUI to specify that this logic will be executed on the result set of the data request.

The customer has the option to specify that its own compressed data should be included in the request for processing or to be householded with data store data to identify relationships and eliminate redundant information.

Once the executable request is completed, the request is electronically transmitted to the data store and the entire process is automated. Because the universal data objects and the customer data are already maintained in a standardized object format (e.g., with data object headers), the APL can read and manipulate specified data and logic without additional intervention, and the customer data will be compatible with the data store data for householding or other purposes.

The data is returned in a layout specified by the end user on the GUI. Thus, advantageously, data object standardization and layout specification eliminate the need for programmers to write code to submit customer data to the credit companys standard process and to prepare the report layout.

Unlike the current process, the process according to an exemplary embodiment of the invention, is performed with almost no expanding of data at any stage (unless it is passed to an external program that requires uncompressed data), thus saving valuable storage space. Advantageously, the indexing of the data store data enhances the efficiency of data retrieval and reduces the run time for the entire process.

By contrast, ordinary data stores cannot implement a similar process with currently-available technology.

The efficiencies described herein are achieved according to an embodiment of the invention, with an integrated system comprised of (i) compressed, universal data objects (at the data store and optionally at the customer) and (ii) a consistent APL to access and process data display information and universal data objects at both the data store and the end user site; and (iii) an efficient compression method that can process customer and data store data with almost no uncompressing unless data is passed out of the system or householded according to the end user's instructions.

Advantageously, the integration of data objects, data displays, the APL and the compression method into a coherent system make it possible to automate data exchange, data retrieval and data processing to an extent previously impossible.

In contrast with current products, the inventions allows the end user to control householding specifications directly and to tailor householding parameters according to the end user's data input and desired output. Through use of a GUI, the end user can manipulate data input and parsing and matching criteria to produce a highly tailored, householded output, without intervention by a third party and without submitting data to a standardized "black box" process.

The invention improves the speed and efficiency of the householding process by using the end user's householding specifications to prioritize parsing operations and eliminate unnecessary processing. The invention also uses the end user's specifications to reduce the amount of data against which the end user's data is parsed by creating smaller parsing tables with indices that allow rapid data lookup and retrieval. The invention maximizes the use of system memory, thus eliminating extensive I/O exchanges that slow traditional householding processes.

It should be kept in mind that the process set forth above is illustrative of one exemplary application of the invention, but there are many other possible applications. In general, the invention has the potential to generate efficiencies wherever end users access remote data stores or seek to household different records.

As noted above, so long as data stores store their data in the prescribed object form, it is possible to submit a request to multiple data stores, so that data might be obtained from one data store and automatically submitted to processing logic obtained at another data store, or a request for data retrieval might be constructed using information from several data stores and then sent seriatim to each data store to retrieve all relevant information and return the results to the end user.

These and other aspects of the invention will become apparent from the detailed description set forth below.

DETAILED DESCRIPTION OF THE PREFERRED EMBODIMENT(S)

Figure 1:
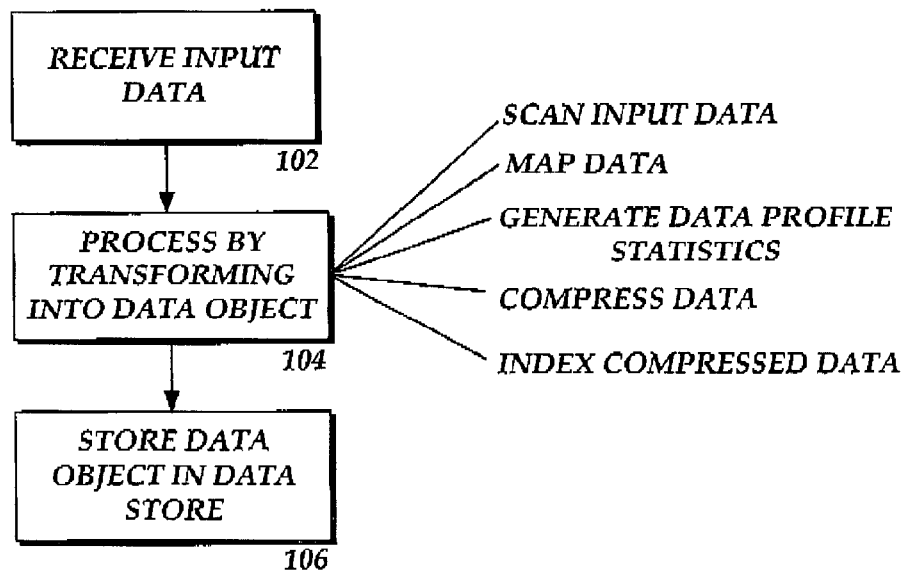
FIG. 1 shows the process of creating a data object from input data.

The invention will now be described in more detail by way of example with reference to various exemplary embodiments. It should be kept in mind that the following described embodiment(s) is/are only presented by way of example and should not be construed as limiting the inventive concept to any particular physical configuration.

The invention concerns a method and apparatus for constructing and executing customized data retrieval and data processing requests for compressed universal data objects stored in a data store. The data store described herein refers to either a local or remote data store, or both. The data store is optimized for effective data storage and retrieval in order to facilitate such requests.

In a preferred embodiment of the invention, the data store contains indexed, compressed data objects, and all of the operations described herein are performed with almost no uncompressing of the data at any stage, except when data is moved into memory for householding, as described herein. The ability to create and manage such a data store of compressed universal data objects can be purchased commercially from Norbert Technologies, LLC under the trade name CorWorks®. Requests can be executed on a wide variety of data types and formats, including ASCII (American Standard Code for Information Interchange) data, EBCDIC (extended binary coded decimal interchange code) data, variable length files and data stored in data base extract files and on personal computers.

The invention enables the electronic display of information about the contents of a data store and logic made available by such a data store. A client application in remote communication with the data store allows an end user to view, access and manipulate this data store information electronically to build a customized request for data retrieval and data processing.

Optionally, the end user may include its own compressed data with the request so that automated processing can be performed on end user data in addition to the data store data. Upon submission of the completed request, the request is automatically executed at the remote data store and the results are returned in a format specified by the end user. A preferred embodiment of the invention will now be described in more detail.

The invention supports the use of householding. The GUI permits an end user to design a highly specific and tailored householding request. After an end user specifies its householding requirements, the system uses this information to increase the speed and efficiency of the householding process by (i) tailoring the parsing table based upon the end user's request and moving the tailored parsing table into memory to reduce time-intensive I/O processing; (ii) creating a series of execution tables to rapidly eliminate bad data and avoid searches that will not match the data to the parsing table; and (iii) indexing the parsing table to facilitate record lookup.

DATA OBJECT CONSTRUCTION

An exemplary embodiment of the invention is implemented in connection with a data store comprised of compressed data objects. Each data object consists of two distinct sections: (i) a data object header and (ii) raw data. The data object header contains information that identifies and describes the raw data contained in the data portion of the data object.

Data object header information may include, for example, the type and length of various record data fields, the date each data record was created, the key field that identifies each individual record, the record file type, and other information about the raw data contained in the data object. Individuals skilled in the art will recognize from the process described below that a wide variety of additional information can be included in the data object header within the spirit and scope of the invention.

A "Merge" program, described below, creates the data object and maps the data object header information to the raw data as noted at header operation 502 of FIG. 5. Because the raw data is mapped to the data object header by the merge, the raw data is advantageously not stored in a physical table or other rigid schema.

The compressed data objects contained in the data store are created by executing a Merge program against selected data files as mentioned above. The Merge program can be run against various types of files from a wide variety of sources, including American Standard Code for Information Interchange (ASCII) files, extended binary coded decimal interchange code (EBCDIC) files, database extract files, and file types stored on personal computers, including files stored, for example, in Microsoft Access® and Microsoft Excel®. As discussed in more detail below, Merge can read and compress variable length records and complex data types.

Before executing Merge, an end user uses a client application installed on a personal computer to select and prepare files for compression and storage in data object form. In a preferred embodiment, the client application includes a point-and-click graphical user interface (GUI) that controls an application programming language (APL). The APL is used to select files and prepare files for submission to Merge. A personal computer supporting the client application should have, for example, at least the following minimum specifications: a 233 Mhz processor; 16 megabytes of RAM; 50 megabytes of available hard disk; a monitor; and a mouse.

An operation according to an exemplary embodiment will now be described (See FIGS. 1, 4, and 5) Using the GUI, the user identifies files for conversion to data object form by double-clicking on the desired files, for example, as noted at selection operation 402 of FIG. 4. The GUI then generates a series of screens to prompt the user to enter information that will eventually be stored in the data object header, as noted at input operation 102 of FIG. 1, and further at entry operation 404 of FIG. 4.

As a first step, the GUI requests a Source I.D., which will be attached to the data file and retained in the header when that file is converted to data object form. A Source I.D. identifies by source the types of records contained in the file. For example, a file with records originating in a company's checking account system might be given a Source I.D. of "001," while a file with records originating in a company's credit card system might be given a Source I.D. of "002."

After choosing a Source I.D., the user designates a key field for each file, which is a record field or combination of record fields that will be used to uniquely identify a record or group of records in the file. The key field can be a combination of the Source I.D. with a particular data field or other information selected by the end user. For example, an end user might identify each record contained in a file of checking account records by constructing a key field that is a combination of the Source I.D. "001" and the value contained in record data field "Account Number." Thus, if a checking account number and a credit card account number happen to be identical, the Source I.D. will differentiate the key field information. If a file is received with records that lack a logical or potential key field, a virtual key field can automatically be constructed, either assigning key field numbers sequentially or allowing the end user to choose its own key field system.

Another part of the data object header according to an exemplary embodiment of the invention is record layout information. If the selected file originated in a relational database management system (RDBMS), Merge will directly read and interpret the layout information using the RDBMS catalog. Merge performs an analogous process on personal computer-based databases. In the event that the data is not stored with a catalog, however, the end user may use the GUI to select an actual record with layout that is representative of the other records, or, alternatively, to create a record layout which is representative of the records stored in the file and which will be used to identify the record fields and field attributes.

In order to create a representative record layout using the GUI, the end user must know how many fields are included in each record that the end user wishes to bring into the system, the order in which the fields appear, and how many bytes are included in each field. The end user enters the name of each field into the GUI in the order in which the fields appear in each record and also enters the number of bytes included in each field. The record layout contains the same fields as each of the records stored in the file, and each field in the record layout has the same attributes, e.g., number of bytes, text vs. numeric, as the corresponding record field stored in the file.

An individual skilled in the art will recognize that the Source I.D., key field and record layout examples included herein are not exhaustive and that the invention can accommodate a wide variety of data object header information, e.g., date of file creation, location of file creation, file owner, in order to better identify and/or describe the raw data that will be contained in the data object.

An embodiment of the invention accepts unformatted raw data, e.g., images, sound, word processing files, as well as formatted raw data. Unformatted data does not require layout information. Data object header information may include data size, date and location of file creation, and other information, which may be appropriately associated with unformatted data.

Once this preparatory work is completed, the job can be submitted to Merge for data object creation as noted at process option 104 of FIG. 1. Merge executes on a variety of platforms, including servers running UNIX or Microsoft NT® or personal computers running Microsoft Windows®, for example, provided such servers or personal computers have approximately 256 megabytes of memory and 100 megabytes of available disk space.

Figure 4:
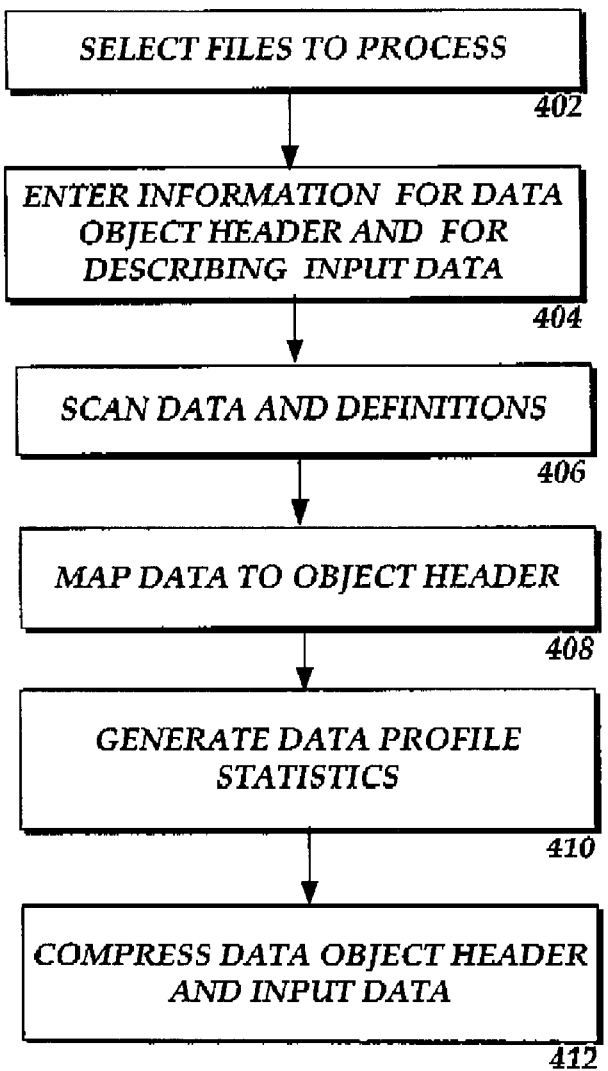
FIG. 4 shows additional details of the process of creqting the data object from input data.

Upon execution, Merge scans the data and associated data definitions contained in the selected data files as noted at scan operation 406 of FIG. 4, maps the data to the previously defined header layout information as noted at mapping operation 408 (or reads the catalog to ascertain the header layout information and map the raw data) and generates data profile statistics as noted at statistical operation 410. Merge also compresses the data object header information and raw data as at compression operation 412 to complete the compressed data object as noted at formation operation 504 of FIG. 5. By counting bytes as the data input is brought into the system, Merge can use the pre-entered field length information to insert a break at the end field and to map the data input to the pre-entered field names in the order that the data input is received. The process by which the invention counts bytes and identifies data values and other information as data input is brought into the system is referred to as scanning the data.

As noted above, Merge converts a wide variety of file types to compressed universal data object form, which facilitates the use of the invention with a wide variety of data types. In addition to its ability to convert ASCII files, Merge converts EBCDIC files to compressed universal data object form directly from their mainframe source, without an interim conversion to ASCII. Advantageously, the universal data objects created directly from these EBCDIC files are identical to the universal data objects created from ASCII files.

Furthermore, Merge scans variable length files. In order to read variable length records, the end user uses the GUI to specify the record length of the variable length records according to a pre-existing layout. The GUI permits the end user to manually specify the length of each record or to enter conditions that will determine how long each individual record will be. Finally, Merge compresses all 256 EBCDIC characters, so data quality will not be compromised even on complex data types.

As Merge brings data into the system, it uses system resources to generate and store data profile statistics. For example, Merge keeps a running tally of each data value that it scans and records, among other things, minimum and maximum data values for each field and a specified number of the most common data values for each field. An individual skilled in the art will recognize that a wide variety of sophisticated data profile statistics and derived data values can be automatically generated as Merge scans the data input brought into the system.

Data profile statistics generated as data is brought into the system (e.g., minimum and maximum data values) are included in the data object header. Header information remains flexible and can be used to store additional information in the future. The invention permits an end user to append new information to the object and to update header information accordingly, without running a subsequent Merge operation on the entire updated file.

The scan and compression components of Merge work together to store the data objects in an indexed, compressed format as noted at store operation 106 of FIG. 1. Using the key field identified by the end user, which key field identifies each record in the file, the scan feature builds an index of key field values and organizes it into alphabetical or numeric order (depending upon the key field). The Merge also sorts the records themselves into alphabetical or numeric order by key field as they are compressed and stores them in compressed data "blocks."

Associated with each value in the index is the logical address of the data block containing that key field data value. When the end user requests a record, the record key field is identified and then the index is checked for the logical address of the block containing the particular key field value. Upon reaching the appropriate logical block of data, one row of data in the middle of the block is expanded and an attempt to identify a match for the key field is made. If a match is not found, a binary search is begun for the key field, searching either midway up the block or midway down the block, depending upon whether the key field requested was higher or lower than the first key field identified in the block. Once the appropriate key field is found, only those records having an identical key field are searched to identify a match for the record.

Other than the expansion just mentioned, data object header and raw data are kept in and manipulated in a compressed state.

Upon completion of the Merge process, all selected data files have been converted to indexed, compressed data objects, each comprised of object data headers and raw data. The header contains layout information and other descriptive information, including data profile statistics. The raw data portion of the object includes the actual data and the data index.

The Merge process described above can be reproduced by the user for each batch of files received for processing. Alternatively, the user can select initial settings and then automate the process, so that the invention will automatically convert files into data object form and load the data store according to a schedule defined by the user.

BUILDING AND SUBMITTING CUSTOMIZED REQUESTS

The exemplary embodiment of the invention allows end users to access data objects of the type described above at remote data stores for retrieval and manipulation.

Figure 2:
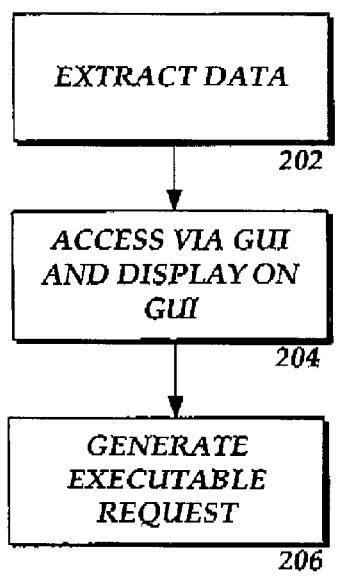
FIG. 2 shows the process of creating an executable request pertaining to the data object.

In a method according to an exemplary embodiment of the invention, a data store makes data object header information available so that such information can be viewed by potential end users. An end user, using a client application in electronic communication with the data store, views the data object header information that the data store has made available. The client GUI allows the end user to access those data object header items that are of interest to the end user and to manipulate those data object header items to build a customized request for data and data processing. (See FIGS. 2 and 3)

Optionally, an end user having data stored in data object format can combine its own header information with the request and attach its own compressed data to be submitted with the request. Once the request is completed and the end user's compressed data, if any, is included with the request, the compressed request is submitted to the data store electronically for automated execution, as noted at execution operation 302 of FIG. 3.

Figure 3:
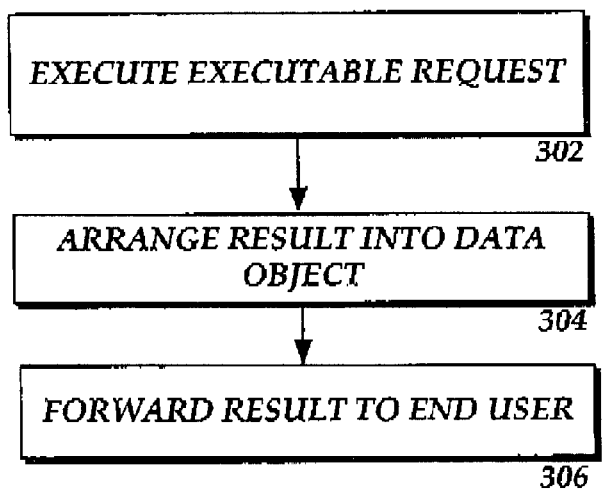
FIG. 3 shows the process of executing the request to provide a resultant data object.

The data store execute the data request and any logic specified by the request and returns a customized result set, as noted at object operation 304 of FIG. 3, to the end user in a format designated by the end user, as noted at forward operation 306 of FIG. 3.

Figure 5:
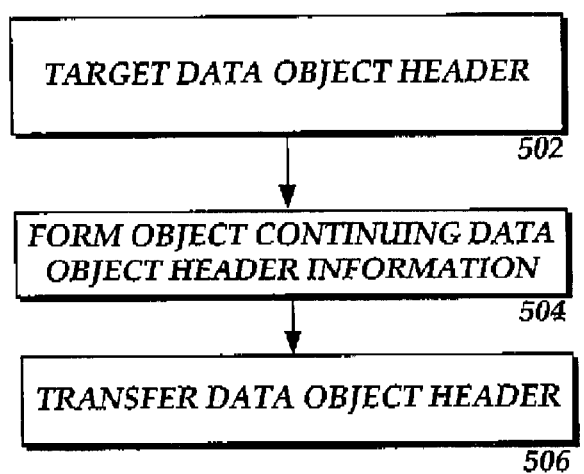
FIG. 5 shows the process of forming a data object header for the data object and providing that data object upon request to the user.

In a method according to an exemplary embodiment of the invention, data object hearder information is made accessible to remote end users via, for example, the Internet or an internal network such as through transfer operation 506 of FIG. 5. An object of this method is to permit a data store to create an electronic header display describing the types of information stored in the data store, and to permit end users to view and access this header display.

In order to display data object header information, the data store runs a "Get Header" request against a data object to extract the header information from the data object. Get Header identifies the targeted data object by reference to a data object identifier, which is an internal object naming convention constructed during the Merge process. The Get Header process extracts the header information only; it does not extract any raw data. It also does not affect the data object, which remains stored in its original form with header married to data. The extracted header information forms a separate and distinct "extracted header object" containing only header information. A file transfer protocol or other transfer mechanism is then used to transport the extracted header object to a central storage area.

In a preferred embodiment of the invention, the extracted header object is transported to and maintained on a network server. Using commercially available display tools, such as Microsoft's Visual Basic®, header information is rendered available for viewing by potential end users. Thus, remote end users in electronic communication with the data store network server can view the extracted header object information in order to survey the kinds of data contained in the compressed data object store, including any data profile statistics created during the Merge process.

The invention also includes a method whereby proprietary logic (i.e., data processing instructions) can be made available for remote viewing and selection by end users. Using a programming language, such as C, Cobol or SAS®, logic of any level of complexity can be written and stored at the data store. Once the logic is created, the invention allows the end user to create an interface between the logic and the APL, which specifies the appropriate input and output parameters for the logic. The logic will indicate the data input that it requires and how that data input should be provided. Using the layout information already stored in the header of the data object, the invention allows the end user to map the fields required by the logic that the end user wishes to access into the input positions required by the logic. Once this mapping is completed, the logic can be called by an APL request created by an end user and the invention will provide the data values corresponding to the mapped fields to the logical process as required. Upon conclusion of the process, the logic will provide specified data outputs, which will be mapped by the end user back into the appropriate fields for further processing, as necessary. An electronic representation of available logic can also be created for storage and display on a network server so that it will be available for viewing and access by end users.

According to another aspect of the invention, an end user can access the header and logic display, created according to the method described above, for example. In this aspect, the client application is hosted on a personal computer, for example, which is in electronic communication (possibly over the Internet or a private network) with the network server storing the header information and logic representations. The client application interfaces with an Internet browser and acts as a browser application permitting the end user to use the GUI to access the data store header information and logic, upon being extracted from the header at extraction operation 202 of FIG. 2, that is stored on the network server, as noted at access operation 204 of FIG. 2. The GUI uses the same APL that was used to create the data object store and is, therefore, compatible with the objects contained therein.

According to a preferred embodiment of the invention, the end user uses the GUI to select desired header information and logic from the data store display using intuitive, point-and-click commands. The GUI APL manipulates header information and logic representations created according to the process set forth above. Header information and logic representations corresponding to choices made by the end user are transferred from the network server to the client application using standard data transfer techniques and protocols, such as TCP/IP for the Internet. Thus, the end user captures header information identifying specific raw data contained in a remote data store and information identifying logic to be executed on this data.

As noted above, header information can represent a specific record or group of records, a specific data field contained in all of the records, a rank ordering of the values most frequently appearing in a particular field, the minimum and maximum values contained in a particular field, or a wide variety of other variables created by the Merge. Logic can include any process created and stored at the data store.

As also noted above, the data store has the flexibility to change or amend the available headers and available logic.

The GUI is used to manipulate header information and logic to create a customized request for data retrieval and data processing. In this exemplary method according to the invention, the retrieved header information and logic are displayed on the client GUI, and the end user points-and-clicks to manipulate the header information and logic to create a customized request. As the end user manipulates the header information and logic represented on the GUI screen, the client application generates APL to integrate the header information and logic into an executable request corresponding to the end user's commands, as noted at request operation 206 of FIG. 2. The APL will call the raw data and logic corresponding to the accessed header information and logic representations after the request is constructed and executed, as specified by the end user.

In the preferred embodiment the client application contains standard instructions, which the end user may select to structure a request. Such standard instructions might include simple data retrieval requests, e.g., a "Get Data" command, condition logic, e.g., "if/then" statement, or standard commands to simplify query construction, e.g., "and/or," "greater than or equal to".

Alternatively, a programmer using APL can write customized instructions that can then be integrated into the final end user request.

According to another aspect of the invention, requests can be built either online or offline. In one exemplary embodiment of the invention, the end user request is built while the client application is in active communication with the data store. In another exemplary embodiment of the invention, the end user can save the header information and logic representations and build a request offline, which request can be submitted when the end user reestablishes contact with the data store.

In yet another exemplary embodiment of the invention, a data store could store this information on any medium, e.g., a pre-packaged array of header information distributed on CD ROM, to permit an end user to construct a request offline and access the data store only to submit the request.

According to another aspect of the invention, an end user building a request according to the method described herein has the option to integrate its own header information and logic representations into the request and to attach its own data to the request. In order to construct such a request, an end user having an object data store of the type described above retrieves header information from its own object data store. This header information is stored locally for access by the client application. The end user builds a request in the manner described above, but in this case the end user integrates the data store header information and logic with its own header information and logic.

The GUI is designed to accommodate data store header information and logic and end user header information and logic on the same GUI screen at the same time. When the end user has finished constructing a request combining data store and end user header information, the end user attaches compressed data corresponding to the end user header information included in the request. The resulting universal data object, therefore, contains a header, which may include end user header information and logic and data store header information and logic. The universal data object may also include the end user's compressed raw data, which corresponds to the end user header information.

According to another aspect of the invention, the end user uses the GUI to specify the layout in which the final output will be returned to the end user. In a manner similar to the manner used by the end user to create the record layout for the Merge process, the end user selects (or creates) a record layout that contains the fields and field attributes necessary to accommodate the end user's expected result set. These result layout specifications are included in the header of the request sent to the data store, and the result is formatted according to the end user's desired result layout.

PERFORMING HOUSEHOLDING ON END USER DATA

Householding operations can be performed using end user data. Although one embodiment of the invention performs householding on compressed universal data objects, householding, as described herein, can also be performed as a discrete function on raw data that is not stored in universal data object form and not transmitted over a network.

Householding is a process whereby relationships among different records are identified. For example, householding might be used by a bank to identify a relationship between a checking account held at the bank and credit card account information held at a remote credit bureau, even though the information pertaining to these accounts is stored on different systems and the only information in common between the two record types is the customer's name and address (household).

To perform this operation, the bank would first parse the data in order to understand the input data and to eliminate incorrect records and/or records that the end user does not wish to include in the request. To parse the input data, the end user would attempt to match a checking account record to a householding reference list (the "Reference list"), such as complete U.S. postal records, in order to verify that the record information is current and correctly entered.

Once the information is verified as accurate, the system then attempts to match the checking account record name and address to a credit bureau record name and address. Once a match is found, the system can alert the end user to the relationship between the two accounts or insert a "hard link" to ensure that the relationship between the accounts is always noted. This information might be used to eliminate redundant promotional mailings or to allow a company to cross-sell products from different parts of the business to existing customers.

The invention includes a householding process that allows the end user broad flexibility to specify the data patterns that the end user will accept as a match for its particular parsing and householding purposes, without sacrificing performance. For example, end users can specifically tailor match parameters for jurisdictions having different naming or addressing conventions, or craft match parameters tailored to their specific raw data or intended use. It also allows end users to tailor how they will compensate for data entry errors contained within end user records.

In a method according to the invention, the end user enters data input from a record layout information for the file that the end user wishes to household into a GUI, in the manner previously described (if such information is not already stored in universal data object form). The invention maps the layout information to the file raw data as that data input is brought into the invention, in the manner previously described. Alternatively, if the selected file originated in a RDBMS, the invention could directly read and interpret the layout information using the RDBMS catalog. An individual skilled in the art will recognize that there are a number of different ways to enter and store layout information and raw data in a manner that permits mapping of layout information to the data input. As each file is brought into the invention, each record in the file is assigned a sequential number for identification purposes.

In a preferred embodiment of the invention, the invention will standardize characters for parsing and matching as data input is loaded into the invention, according to preferences indicated by the end user. In the preferred embodiment, the invention displays all 256 potential characters on a GUI screen. An end user can point and click to specify which, if any, characters are to be changed as the data input is loaded into the invention in order to ensure that data is in the format desired by the end user for parsing against the chosen Reference list(s). For example, an end user could indicate that all data should be changed from lowercase to uppercase characters. An end user might also compensate for a known data entry error by entering instructions to change a particular symbol, letter or number appearing in a specific field to another symbol, letter or number that corresponds to data conventions in a reference list.

Is In a preferred embodiment of the invention, the end user uses the GUI to parse the data by specifying those relationships between records that the end user wishes to show as a "match." End users may specify, field-by-field, the kind of match that will be deemed acceptable. For example, an end user might build a householding request that identifies the relevant fields as the "name," "street," "city," and "zip code" record fields, while excluding the "account number" field as irrelevant. The end user would then construct several different potential record structures to capture the data in an attempt to determine which items of raw data fall into fields that match the end user's reference list.

An end user might create one scenario in which the zip code will appear in the fourth field, one scenario where it will appear in the fifth field and one scenario in which it will appear in the sixth field. The end user could then build in fault tolerance for particular fields.

For example, the end user might specify that the request will tolerate a letter transposition or missing letter as a match in the "city" field or in the "street" field so long as the "zip code" field is an exact match. Alternatively, the end user might specify that it will tolerate a typographical error in the "zip code" field so long as the "city" and "street" fields are exact matches.

In another variation, the end user might tolerate a transposition of the first and last names in the "name" field so long as "address," "city" and "zip code" are exact matches. Each of these alternative "match" scenarios are constructed by the end user with the GUI, and each record will be tested through each scenario in turn in order to identify whether or not a specific address will be accepted for householding.

An application of the preferred embodiment of the invention to a file containing many customer records will now be described in more detail by way of example, with particular reference to customer "Name" information stored in each record. (See FIGS. 6–10)

Figure 6:
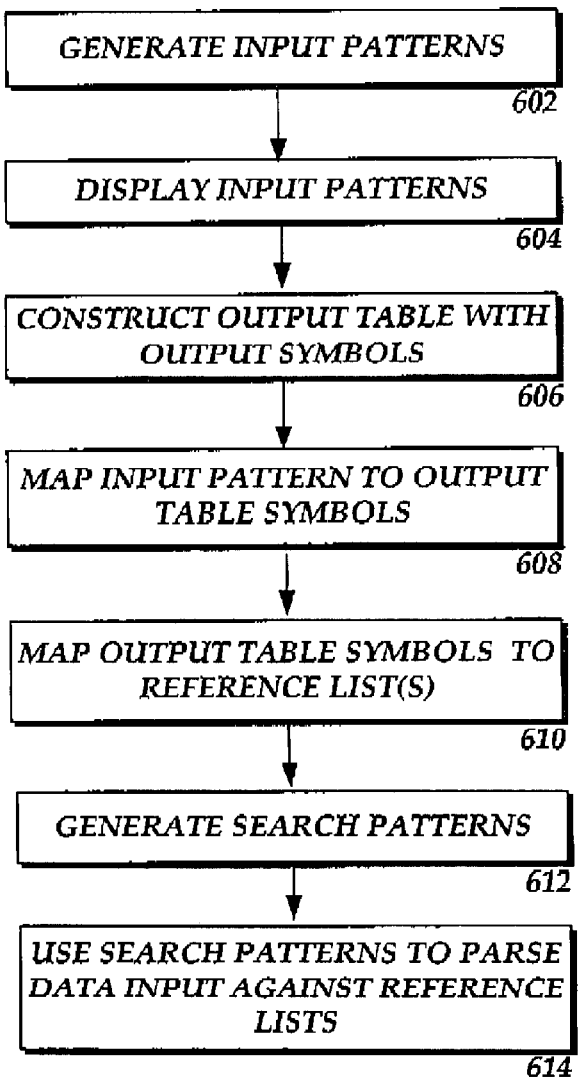
FIG. 6 shows the process of generating search patterns from the input data.
Figure 7:
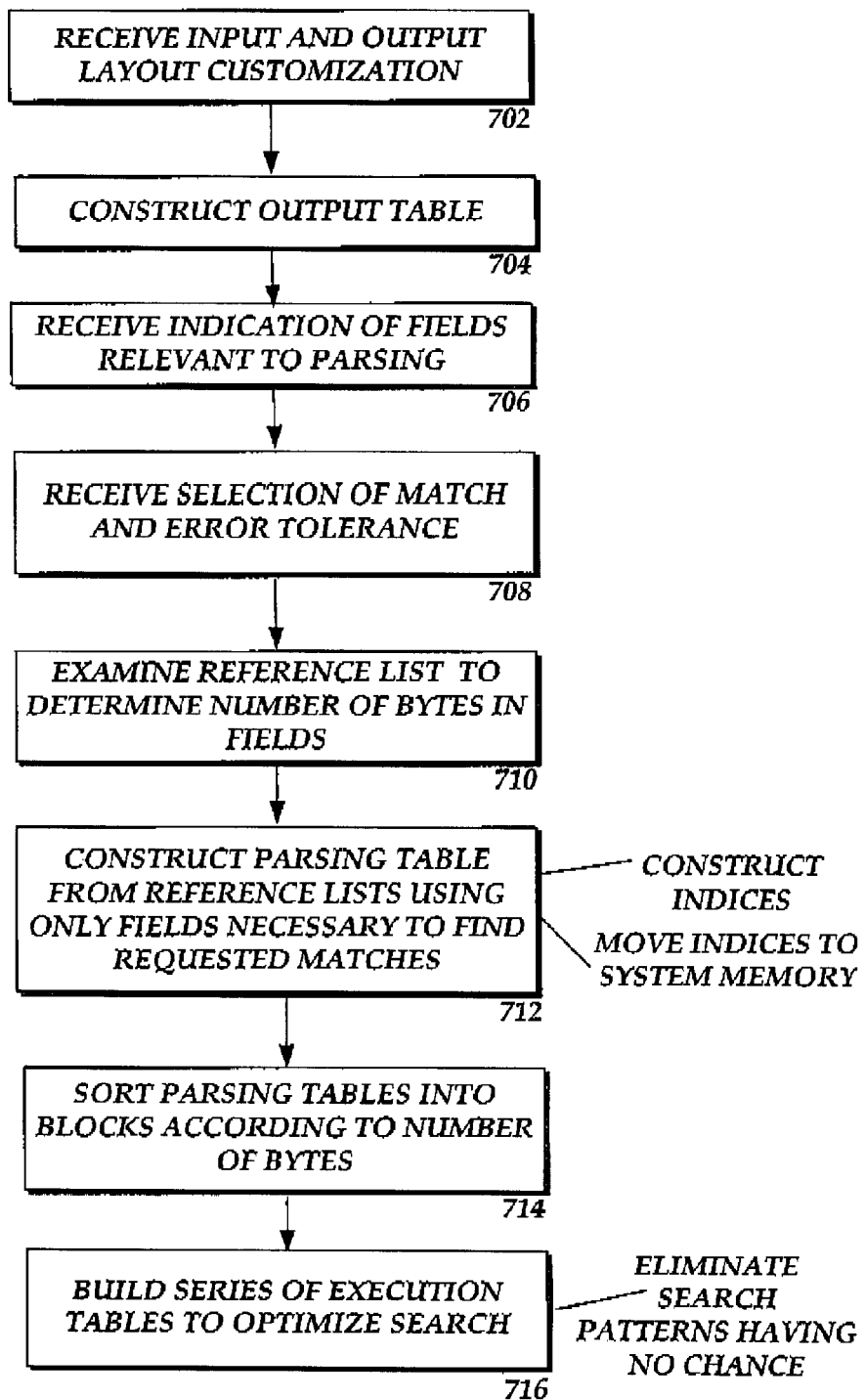
FIG. 7 shows the process of generating parsing and execution tables for conducting searches of the input data

After the relevant data file is loaded into the invention and mapped to a layout, as noted at layout operation 702 Of FIG. 7, according to the process described above, the end user uses the GUI to select the "Name" field as the first field for parsing. Data input for the Name field will contain several different kinds of customer names, which may include a customer's name prefix (e.g., "Mr.", "Mrs.", "Dr."), first name, middle name, last name, and name suffix (e.g., "Jr.", "3$^{rd}$", "Ph.D.") and/or other variations. Once the end user selects Name as the relevant field, the invention will build "Input patterns" for the field by checking each byte in the Name field for each record in order to determine whether each byte is a letter or a number, as noted at pattern operation 602 of FIG. 6. If the byte is a number, it is assigned "N" to identify it as a number. If the byte is a letter, it is assigned an "L" to identify it as a letter. If more than one byte containing a letter is strung together, without an intervening space, the byte string is assigned a "W" to identify it as a word, Symbols, such as "#", "?", or "—" are generally represented in their original form, subject to the user's standardization preferences, as previously described. The invention is designed with particular conventions interpreting unorthodox strings, (e.g., a letter and a number appearing consecutively, without an intervening space, could be identified as "LN", while other conventions could be for other unorthodox strings).

Once the invention completes its analysis of the Name field for all records, the invention will display the various input patterns included in that field for each record, as noted at display operation 604 of FIG. 6. For example, in a 100,000 record file, the invention might indicate that the input pattern "WWLW-W" W (Word, word, Letter, Word-Word) occurs 5,000 times in the Name field. An example of a name input corresponding to this input patter is "Mrs. Ann A. Smith-Jones." Another example of a name input corresponding to this input patter is "The Honorable A Smith-Jones". Many other input patterns, such as "WLW" (e.g., "Ann A. Smith") and "WLWWN" (e.g., Mr. A. Albert Smith 3$^{rd}$) would be generated by a typical analysis of a large number of Name fields.

In a method according to the invention, the end user uses the GUI to identify the householding reference list against which the end user ultimately wishes to parse the data input. A separate analysitcal file is automatically created with data about the refersne list. For example, the invention examines the reference list to determine the number of bytes contained in each field of each record and stores this field length informaiton with the reference list, as noted at list operation 710 of FIG. 7. In the event that the end user wishes to parse itsi data against more than one refersne list, multiple refersne lists can be designated by the end user. For example, an end user would typically use separate commercially available reference list(s) to parse Name.Prefises, Name Suffixes, and First Names before parsing the entire data input for a given record against a comprehensive reference list.

The end user then uses the GUI to construct an output table for the input data, which output table consits of entries (output table entries) corresponding to data contained in the end user's chosen reference list(s), as noted at table ogpton 606 of FIG. 6. For example, an output table for the Name field would likely consist of at least the following output table entries: "Name Prefix," "First Name," "Middle Name." "Last Name," and "Name Suffix," which fields would also exist in the reference list(s). In order to save memory space later tin the process, each output table entry is represented by a single letter or symbol (output table symbols). For the foregoing list of output tables entries, representative output table symbols could be "P" for "Name Prefix," followed by "F," "M," "L," and "S" represented each of the corresponding output table entries.

Once the output table is constructed, as noted at table operation 704 of FIG. 7, the end user uses the GUI to map the output table symbols to the reference list, as noted at man operation 610 of FIG. 6. To accomplish this, the end user uses a computer mouse to physically drag and drop graphical representations of the output table symbols onto graphical representations of the reference list(s) fields, and the invention builds corresponding programming script to link these output table symbols to the reference list(s) fields according to the relationships indicated by the end user. Thus, for example, the end user might map output table symbol "P" for "Name Prefix" to the Name Prefix field of the reference list. The invention allows the end user to map a single output table symbol to multiple reference list(s) in the event that the end user wishes to check the data input against data stored in more than one reference list. At this stage of the process, the end user has (i) a range of input patterns generated from the data input that the end user wishes to parse and (ii) an output table containing output table symbols that are mapped to the end user's reference list(s).

In a preferred embodiment of the invention, an end user having input patterns and an output table evaluates the input patterns and maps each position in each input pattern to one or more output table symbols in the same manner as the output table symbols were mapped to the refernede list(s), as described above, as noted at map operation 608 of FIG. 6. The invention allows the end user to view data input corresponding to a given input pattern in the event that the end user wishes to generate ideas for possible mapping to the output table. In the event that the end user does not wish to map some input patterns to the output table (e.g., because they represent so little of the data input that the end user does not wish to parse them), the end user may simply leave those input patterns unmapped.

The invention uses the end user's mapping of the input patterns to the output table to generate search patterns for the input patterns, which search patterns represent all of the possible permutations of the input table/output table mapping completed by the end user as noted at pattern operation 612 of FIG. 6. This process generates several different search patterns through which data input will be parsed. Thus, the search patterns represent the end user's mapping of input patterns to output table symbols, which output table symbols are in turn mapped to the reference list(s). Data input corresponding to each given input pattern will be tested through all of the search patterns associated with that input pattern until the invention locates a match to the reference list(s) or until the search patterns are exhausted, as described in more detail below and as noted at parse operation 614.

In another embodiment of the invention, the end user specifies the fault tolerance acceptable for each position in the search pattern as noted at tolerance operation 708 of FIG. 7. For example, given the search pattern PFML-L, the end user might require an exact match for the "Last Name" positions but tolerate some discrepancies in other positions. Alternatively, the end user might tolerate a discrepancy in the "Last Name" positions for the same search pattern, if all of the other positions in that search pattern are exact matches. Thus, a number of different fault tolerance scenarious can be created for each search pattern.

The preferred embodiment of the invention includes pre-built fault tolerance logic that end users can easily incorporate into their search patterns. For example, the invention will allow an end user to automatically classify data as a match for parsing purposes if the first and/or last letters match; to allow for common typographical errors or letter transpositions; and to allow for mistakes made because words or letters sound alike. The end user can also write its own fault tolerance logic, which will be stored by the invention and incorporated into the process at run time when input for the relevant search pattern is run.

Upon completion of this process, the end user has mapped Input patterns to the output table, which output table is in turn mapped to the reference list(s). The mapping of the input patterns to the output table creates different search patterns. Data input for each Input pattern is tested through the search patterns in an effort to find a match to the reference list(s). Specified fault tolerance indicates for each search pattern position (i.e., for each output table symbol within the search pattern) the divergence from the reference list that the end user will tolerate as a match in each position.

The end user may evaluate search patterns generated by the invention, to eliminate any search patterns that the end user believes will not match data input to the reference list(s). The preferred embodiment of the invention employs logical rules to speed processing by eliminating unlikely or unhelpful search patterns before parsing against the reference list(s) begins. For example, the invention will eliminate any search pattern that does not require an exact match on at least one field, so that the invention ensures a minimum level of certainty for any match. The invention will also eliminate certain illogical search patterns, such as search patterns that interrupt strings of identical output table entries (e.g., a search pattern "Name Prefix," "First Name," "Name Prefix" would be eliminated even if this pattern could be generated as a result of end user mapping to the output table, because the "Name Prefix" position would not logically be interrupted by the "First Name" position). The invention also analyzes fault tolerances for each search pattern and eliminates those fault tolerances that would necessarily be satisfied if another fault tolerance for that same search pattern were satisfied, so as to eliminate unnecessary searching. An individual skilled in the art will recognize that these logical rules and other similar rules could be added or subtracted from the invention, depending upon market preferences as well as the desired combination of accuracy and efficiency.

Householding speed and efficiency are maximized by maximizing use of system memory to reduce the time necessary for I/O exchanges with an external device. The end user's GUI-generated householding specifications are used to identify those fields within the reference list(s) that are relevant for parsing, as noted at field operation 706 of FIG. 7, and the invention eliminates from the process all reference list(s) fields to which the end user has not mapped any output table symbols. Separate parsing table(s) (each a "parsing table") are created from the reference list(s), which parsing tables consist only of (i) those fields to which the end user has mapped output table symbols and (ii) analytical information relating each of those fields, as noted at table operation 712 of FIG. 7. As noted earlier, an end user may have more than one reference list, so the invention will create more than one corresponding parsing table, as necessary. In many cases, there are several small parsing tables used to parse particular kinds of data input (e.g., "Name Prefix" or "First Name") to which only search pattern position is mapped and a larger, more comprehensive parsing table to which several positions in the same search pattern are mapped.

The invention uses the end user's search pattern information to build indices on these parsing table(s) to facilitate the location of parsing table data during the parsing process. In the event that a parsing table has no more than one position in each search pattern mapped to it, the invention will access the parsing table and the accompanying field-length information and build an index that stores the length of each value in the parsing table. In the event that a parsing table has more than one position in a search pattern mapped to it, the invention will access the parsing table and the accompanying field-length information and build separate indices for each search pattern position mapped to the parsing table. Each of these indices will store the length of each value in the parsing table, the actual data values themselves and the number of times that each data value appears in the parsing table.

In a preferred embodiment of the invention, the parsing table(s) and the parsing table indices are decompressed (if previously stored in compressed form) and loaded into system memory for fast, efficient reference during the parsing process. In another exemplary method according to an embodiment of the invention, the contents of each parsing table index and the contents of each parsing table are sorted into blocks as they are moved into system memory, as noted at sort operation 714 of FIG. 7, according to the number of bytes contained in the index entries and parsing table fields (e.g., all index entries and all parsing table fields consisting of only one byte will be sorted into the first block of index entries or fields, as the case may be—all index entries and all parsing table fields consisting of two bytes will be sorted into the second block of index entries or fields, etc.). Within these blocks sorted by byte length, parsing tables fields and parsing table indices containing actual data values are further sorted into alpha/numeric order by data value. The invention generates code that "points" from each index entry to the block of parsing table fields containing the same number of bytes or, when the actual data value is included in the parsing table index, to the block of parsing table fields having an identical data value, as described in more detail below. In the event that any parsing table contains two or more fields, each of which must be parsed, the parsing table and its index will be sorted into boyte length and data value order by a primary key field, described below.

Having constructed search patterns from the end user's specifications and having reorganized parsing tables and parsing table indices and moved them into memory, the invention builds a series of execution tables, as noted at build operation 716 of FIG. 7, which are designed to optimize parsing by eliminating at an early stage in the process those search patterns that will not generate a match between the end user's data input and the parsing table(s). In a method according to the invention, the first execution table sorts the search patterns in order to optimize the efficiency of the parsing process after the search patterns are generated but before the invention accesses any of the data input for processing.

For an individual input pattern, there will typically be many search patterns, as described above. For each individual input pattern, the first execution table examines each position within each of the search patterns to determine which search patterns should be parsed first in order to maximize efficiency. Using the end user's specifications, the first execution table analyzes all of the search patterns generated by a given input pattern and identifies the output table symbol for which an exact match is required most frequently in the same search pattern position as noted at analyze operation 802 of FIG. 8. Once this output table symbol and position are identified, the search patterns are sorted so that all search patterns having the designated output table symbol in the designated search pattern position will be analyzed first.

For example, if the first execution table determined for a particular Input pattern that an exact match to output table symbol "F" (for "First Name") was required in the second search pattern position more often than an exact match was required for any other output table symbol in any other search pattern position, the first execution table would use this information to prioritize all search patterns requiring an exact match for "F" in the second position. If there were several search patterns requiring an exact match "F" in the second position, the first execution table would prioritize search patterns within this grouping further. Having prioritized all search patterns requiring an exact match for "F" in the second search pattern position, the invention would then prioritize search patterns within this group according to the output table symbol that must be an exact match in the same position in the greatest number of these search patterns. This process continues until the first execution table has prioritized all search patterns in this group according to the output table symbols in the same position that require an exact match as not prioritize operation 804 of FIG, 8.

Once the first execution table has completed the search pattern sort described above, it will continue its analysis of those remaining search patterns that have not yet been sorted. The first execution table identifies the output table symbol for which an exact match is required most frequently in the same search pattern position, excluding those search patterns that were included in the first group. Once this output table symbol and position are identified, all search patterns having the designated output table symbol in the designated search pattern position are sorted into a second group of search patterns. Within this second group, search patterns are organized in the manner described above for organizing search patterns within the first group. The first execution table continues this process until it has sorted all of the search patterns and prioritized them by identical output table symbols in identical positions requiring an exact match.

Figure 8:
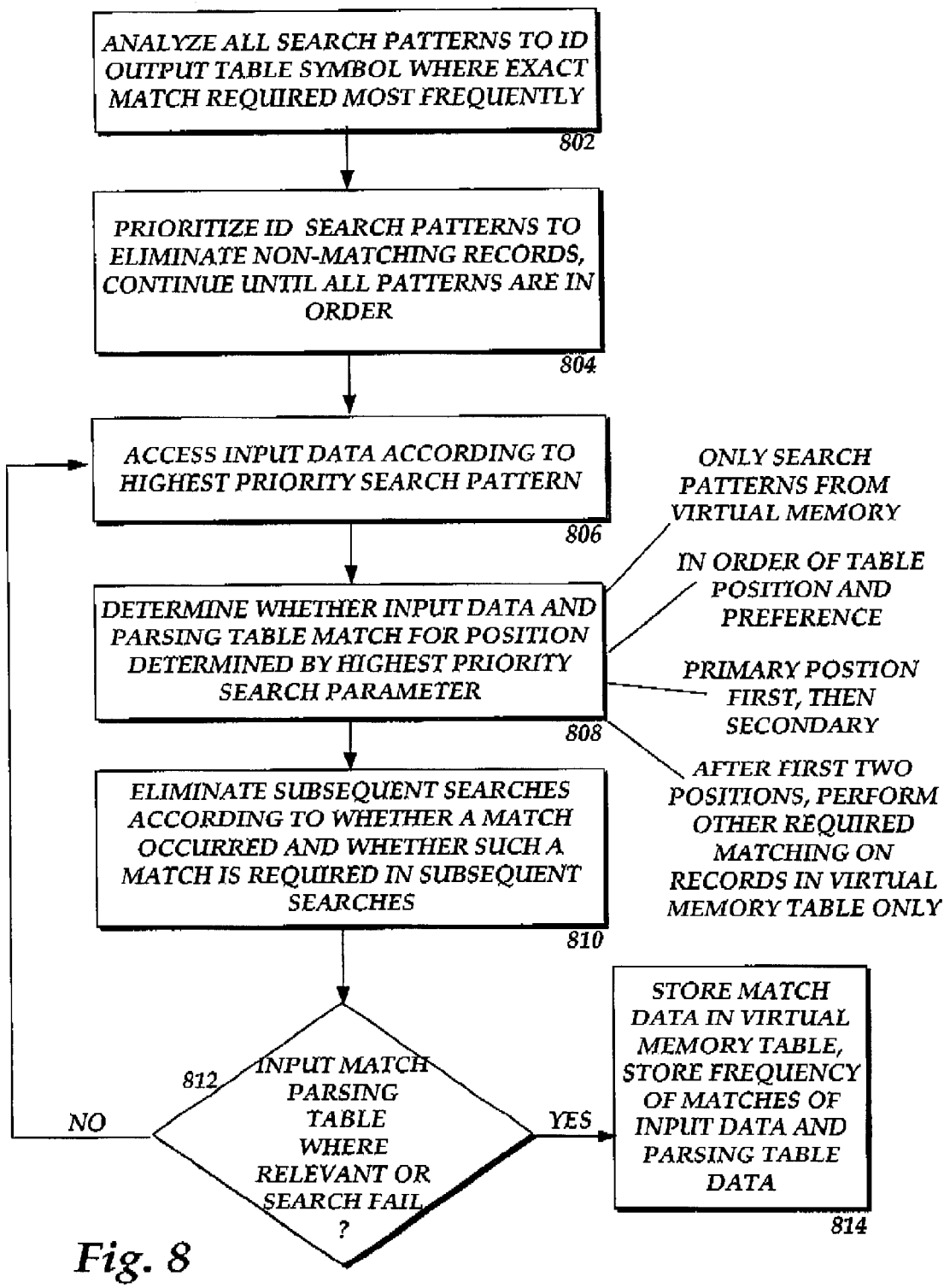
FIG. 8 shows the process of performing searches upon the input data to find matches to the parsing table.

Upon execution of a request, the second execution table will use the search patterns to attempt to match the data input, as retrieved at access operation 806 of FIG. 8, to the parsing table(s), as noted at match operation 808, so that a match will identify the reference list field to which the data input corresponds. The second execution table will begin its processing with the first group of search patterns and move sequentially through each search pattern until the search pattern is eliminated or a complete match to the parsing table(s) is found as noted at query operation 812 of FIG. 8. In the example given above, where the first group of search patterns required an exact match for "First Name" in the second position, the second execution table would first access data stored in the second position of the first data input and determine whether the data for this position matches the "First Name" position in the parsing table(s) to which "First Name" is mapped, as described in more detail below. In the event that this data valued did not match the relevant parsing table(s), all search patterns requiring an exact match "F" in the second position could be immediately eliminated from the process for this data input at eliminate operation 810 and the invention would move to the second group of search patterns, saving processing time and system resources. In the event that a match were found, the invention would continue with the same search pattern and determine which data value to retrieve next from the data input according to the ranking of search patterns with this first group.

If exact matches were found for each of the search pattern positions requiring an exact match to the parsing table(s), the invention would next retrieve data input for those positions in the same search pattern for which some fault tolerance was specified by the end user. This process would continue for the same search pattern until a match was found between the data input and the parsing table(s) in each position or until an attempted match failed and the search pattern was eliminated from the process for the purposes of analyzing that particular data input. If all search patterns were eliminated without a match, the data input would fall into a catchall default "bucket" established by the end user for data input that does not match a parsing table. The invention would then begin the process with new data input.

In order to use the search patterns to compare data values to parsing table(s), the invention will retrieve one data value at a time from the data input, as set forth above. In the event that a search pattern position is mapped to both a subsidiary parsing table, to which only one position in a search pattern is mapped, and to a more comprehensive parsing table, to which more than one search pattern position is mapped, the invention will compare the data value to the subsidiary parsing table before proceeding to the comprehensive parsing table.

In order to parse against a parsing table to which only one search pattern position is mapped, the invention follows the following procedures for those search pattern positions requiring an exact match to the parsing table(s). First, the invention retrieves the data value from the data input and calculates the number of bytes contained in the data value. The length of the retrieved data value is compared to the data value length information stored in the applicable parsing table index. As noted earlier, the entries in the index are sorted into blocks according to the number of bytes in each entry. If the invention does not locate an entry in the parsing table index containing the same number of bytes as are contained in the data value, the invention determines that there cannot be a match to the parsing table, and all search patterns requiring an exact match in this position can be immediately eliminated for the purposes of analyzing this data input. Thus, an entire group of search patterns would be eliminated at this early stage in the process, before extensive amounts of time and resources were consumed in an attempt to match the entire data input to a parsing table.

If a block of index entries having the same byte length as the data value is found in the index, the invention will use the code that "points" to the parsing table to proceed directly to the block of records in the parsing table with data values having the same number of bytes. As noted earlier, the parsing table is sorted into blocks depending upon the number of bytes contained in the data value and then input alpha/numeric order by data value within these blocks. The invention proceeds to the middle of the block of parsing table values containing an appropriate number of bytes and then performs a binary search, moving either higher or lower within the block depending upon whether the data value for which the invention is searching occurs alphabetically or numerically before or after the previous value accessed. In the event that a match for this data value is not found within the parsing table, it can be immediately determined that all search patterns requiring an exact match in this position can be immediately eliminated for this data input. Thus, an entire group of search patterns would be eliminated at this stage in the process, before extensive amounts of time and resources were consumed in all attempt to match the entire data input to a parsing table. In the event that a match for this data value were found within the parsing table, the invention would build a virtual table in memory, at noted at store operation 814 of FIG. 8, to store the match information while it returns to retrieve the next data value from the data input and continues with the search pattern.

In some cases, an end user, knowing of potential faulty data input, might include for parsing purposes a parsing table that contains incorrect data values. For example, a parsing table might contain words with intentional misspellings so that if the data input contains a misspelled data value, the invention will still locate a match in the parsing table and will not discard a correct search pattern simply because a data value is misspelled. In this case, the end user might specify that a different, "cleansed" data value with a corrected spelling should be stored by the invention in memory for inclusion in the data output at the end of the process. The invention stores each data value that matches the parsing table in a virtual table in memory until it completes its parsing for the entire search pattern and discovers whether or not the data input will be a complete match. In the event that a complete match is achieved, the invention will note the position of each data value within the search pattern and store the entire data input for eventual output. In the event that the data input fails to match through a given search pattern at any point in the process, the data stored in the virtual table for that search pattern will be discarded. The process described above is repeated for each data value for which the end user has required an exact match to the parsing table.

In the event that an individual search pattern has more than one position mapped to a parsing table, which parsing table contains related data values corresponding to more than one output table symbol, matching to the parsing table will proceed according to a different process from that described above. Specifically, when two or more different search pattern positions are mapped to related data values in the same parsing table, the invention will not examine the data values for each search pattern position in isolation. Rather, the invention will require that two or more data values received from the same data input match two or more related data values in the parsing table. For example, if one parsing table contains related "First Name" fields inserted in the same records and "Last Name" fields and both the "First Name" ("F") and "Last Name" ("L") search pattern positions are mapped to this same parsing table, the invention will not attempt to match "First Name" and then attempt to match "Last Name" in isolation; it will require that related "First Name" and "Last Name" data inputs match both the "First Name" and the "Last Name" entries in the same parsing table record.

In order to parse data values from the same data input that are mapped to the same parsing table, the invention retrieves the first of these data values, prioritized as set forth above, which data value is the primary key. Upon retrieval of this data value by the invention, the invention calculates the byte length of the data value and proceeds to the parsing table index in the same manner as set forth above. As noted previously, however, the index for the primary key contains the byte length of the various data values and the actual data values themselves, sorted by alpha/numeric order and the number of times each of those data values is repeated in the parsing table. After locating the block of index entries containing the same number of bytes as the data value, the invention proceeds to the middle of this block and performs a binary search, moving either higher or lower within the block depending upon whether the data value for which the invention is searching occurs alphabetically or numerically before or after the primary key value.

If a match to the data value is found in the parsing table index, the invention accesses the information regarding the number of times that the data value is repeated in the parsing table and stores this information in a virtual table in memory. The invention then uses the index code that "points" to the corresponding block of records in the parsing table having the same data values in this position and proceeds directly to that block (unless the data value is unique to one parsing table entry, in which case the index would point to the specific entry). If a match were not found at any stage of the second execution table's attempt to match the data input to the index or to the parsing table, all search patterns requiring an exact match for this data value in this position for this data input would be immediately discarded, as discussed above.

At this stage, the invention would retrieve the second of the data values mapped to this parsing table, prioritized as set forth above. This data value would be the secondary key for the search against the parsing table. Upon retrieval of this data value by the second execution table, the invention calculates the byte length of the data value and proceeds to the separate parsing table index built for the secondary key. The index is searched in the same manner as set forth above. As noted previously, however, the index for the secondary key also contains the actual data values themselves, sorted by alpha/numeric order. After locating the block of index entries containing the same number of bytes as the data value, the invention proceeds to the middle of this block and performs a binary search, moving either higher or lower within the block depending upon whether the data value for which the invention is searching occurs alphabetically or numerically before or after the secondary key value.

Because the parsing table is organized into data blocks according to the primary key, the index cannot point to a block of records with data values identical to the secondary key. Instead, if a match to the data value for the secondary key is found in the parsing table index, the invention uses index code that "points" to the first data value in the parsing table having the same data value in the same position as the secondary key. The parsing table entry containing this identical value also contains code that "points" to the next location in the parsing table that contains an identical data value in this position, and that location points to the next location containing an identical data value in this position, through to the end of the parsing table. Thus, the first primary key entry in the parsing table is linked to all other entries having an identical value in the same position because the parsing table has been arranged to group all of these values consecutively in a block. The first parsing table entry containing a data value that is identical to the secondary key value is linked to all other entries having an identical value in the same position because each such position within the parsing table contains code that identifies the next position having an identical value.

Figure 9:
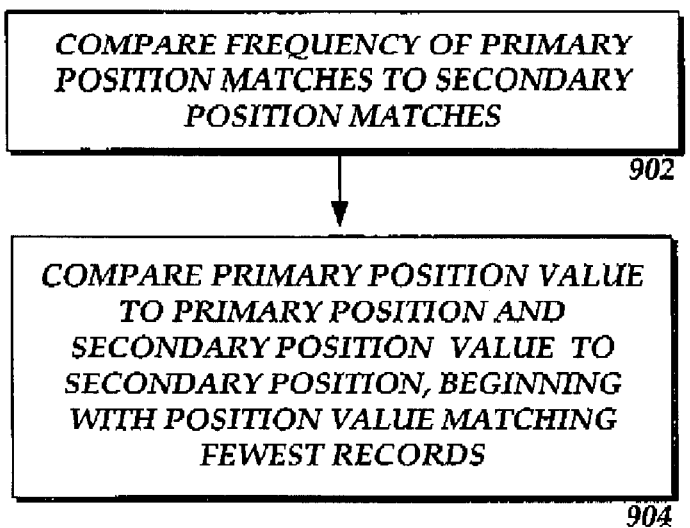
FIG. 9 shows the process of finding the frequency of matches of input data to the parsing table according to primary and secondary search positions.

At this stage, the invention accesses the information regarding the number of times that the specific data value for the primary key and for the secondary key is repeated in the parsing table and compares this information for the primary key and the secondary key, as at compare operation 902 of FIG. 9. In the event that the primary key value appears fewer times in the parsing table than the secondary key value, the invention will proceed to the first record in the block containing the primary key value and begin to search each record in the block to determine whether it can also match the secondary key value to any record in that block. In the event that the secondary key value appears fewer times in the parsing table than the primary key value, the invention will proceed to the first record containing the secondary key value and begin the search each record containing the secondary key value to determine whether it can match the primary key value to any record to which this first record is linked. By beginning with the key value that matches the fewest records, as at compare operation 904, the invention minimizes the number of records that must be searched. The invention creates a virtual table in memory to record the posit on within the parsing table for each record containing matches for both the primary and secondary keys.

If a match for either the primary or secondary key fails at any stage in this process, all search patterns requiring an exact match for these data values in these positions for this data input would be immediately discarded, as discussed above.

In the event that a match were found for the secondary key in one of the records for which a match was already found for the primary key, or in the event that a match were found for the primary key in one of the records for which a match was already found for the secondary key, the invention would return to the data input and access the data value for the next search pattern position that is mapped to the same parsing table, if any, prioritized as set forth above. There is no index in memory for this third search pattern position, however. Instead, the invention proceeds directly to the virtual table storing information about the location of all records for which matches were found for the primary and secondary keys. The invention will begin to compare the data value for the third search pattern position to the appropriate position within each record for which a match was found for the primary and secondary keys. A virtual table stores the location of all records within the parsing table for which a match is found for the data stored in the third search pattern position. By attempting to match the data stored in the third search pattern position only to the subset of parsing table records for which the primary and secondary keys matched, the invention speeds the process by reducing the number of parsing table records to which the data must be compared.

The invention will continue to access the data input for subsequent search pattern positions requiring an exact match to the same parsing table and to search for matches in the parsing table(s) as described above for the third search pattern position until all search pattern positions requiring an exact match to the same parsing table are satisfied or until the search patterns are exhausted.

Figure 10:
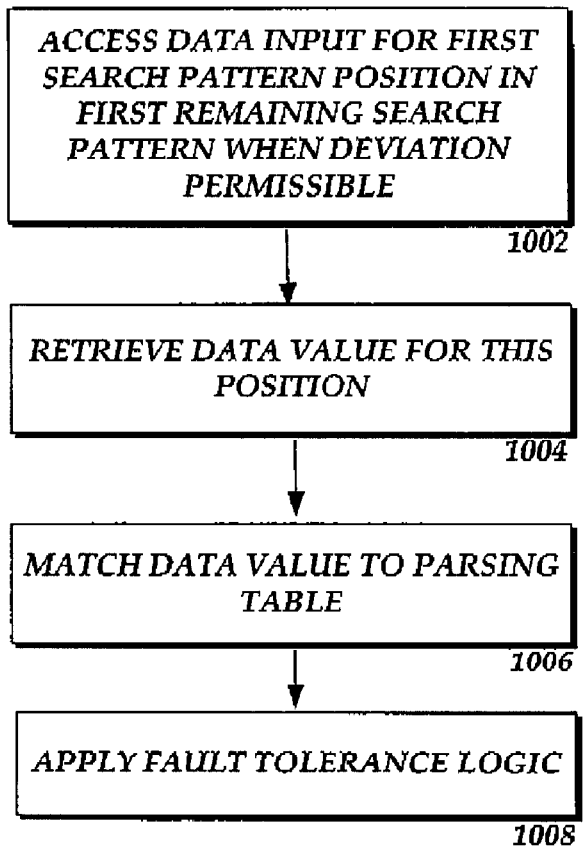
FIG. 10 shows the process of performing a search to find a match of input data to the parsing table based on deviation permitted by fault tolerance logic.

When this process has bee completed for all of the search pattern positions requiring an exact match to the parsing table(s), the third execution table will access the data input for the first search pattern position in the first remaining search pattern for which the end user has required a match but indicated that some deviation from the exact data contained in the parsing table(s) is permissible, as at access operation 1002 of FIG. 10. The invention then retrieves the data value for this search pattern position as at retrieve operation 1004 and attempts to match it to a parsing table as at match operation 1006, applying fault tolerance logic as specified by the end user as at tolerance operation 1008. In the event that a match is not found, all search patterns applying the same fault tolerance to the same data value in the same search pattern position for the same data input can be eliminated. When the parsing process is completed, the end user will have a complete and standardized set of information within the end-user created specifications (match parameters) and fault tolerance (permitted deviation from the reference list). As noted above, this information is stored each time a match for an entire data input is found using one of the search patterns generated by the invention. The invention stores, for output purposes: (i) the data input, (ii) the search pattern positions into which the data input falls; and (iii) any substitute or adjusted data added during the process to correct faulty data input.

Those data inputs that did not match the parsing tables are collected in a catchall "bucket" at the end of the process. The end user can view or print this data to examine why it did not match the parsing table(s) and make adjustments to the process if necessary to ensure a match for some or all of the remaining data.

The parsed data output created by the invention can then be matched or householded with other records in the same file or in other files to demonstrate previously unrecognized relationships among records or with records from another source. For example, because the data input has been run through the search patterns and matched to the parsing tables, it is now readily apparent that data inputs "Mrs. Ann A. Smith-Jones," "The Honorable A. Smith-Jones," and "Mary Ann A. Smith-Jones" contain data values that belong in different positions in the reference list, even though the invention initially identified them all as generic Input pattern "WWLW-W." By using the search patterns to compare these data inputs to the parsing tables (which were derived from the reference list) the invention has discovered where each data value fits within each record as compared to the reference list. The examples given above would have been matched to the parsing tables through search patterns "PFML-L," "PPFL-L," and "FFML-L" respectively, so that the invention can now store and output each element of the data input in its proper position. The invention may also have cleansed the data as set forth above, depending upon the instructions provided by the end user. Because the invention has identified Mrs." and "The Honorable" as Name Prefixes and determined that "Mary Ann" is a First Name rather than a Name Prefix, the invention can now compare and match these data inputs to publicly available reference list(s) or other data in a straightforward manner for householding purposes.

Matching is performed in a manner similar to the way in which input data was matched to the parsing table, except that if parsing has already been completed, there is no need to generate input patterns and to use search patterns to determine the proper positions of data inputs. Rather, the invention can perform a straightforward comparison of First Names to First Names, Last Names to Last Names, etc.

As noted above, each record is sequentially numbered as it is brought into the invention. These sequential numbers remain with these files throughout the parsing and matching process.

Individuals skilled in the art will recognize that many different parsing scenarios could be constructed using the end-user-driven, execution table process described above. The above explanation is intended to describe a process for allowing end users broad flexibility to tailor their householding request without sacrificing the speed and efficiency of the householding process.

In order to accomplish these goals, the end-user-defined householding specifications are used to create (i) an indexed parsing table that can be held in memory, and (ii) levels of execution tables that can be used to rapidly eliminate records that do not match end user specifications for incoming data or patterns found in the parsing table.

This parsing and matching can be used in combination with the other process described above to execute a householding request on data stored in a remote data store. For example, according to the process of making header information and logic representations available to end users, as described above, the data store makes a representation of householding logic available to remote end users. The data store also makes available the layout of parsed data that it must receive in order to execute the householding logic that it has made available. An end user, using the client GUI application described above, accesses the householding representation remotely, captures that representation, and integrates it into a request, as described above. The end user then adds its own header information, as described above, to integrate its own data into the householding process.

Before attaching its selected data input to the request, the end user parses the data input according to the end-user-driven, execution table method described above. The end user uses the GUI to establish parsing specifications that correspond to the specifications made electronically available by the data store so that the data store householding process will have the information that it needs to effectively execute the householding request.

Once the parsing is completed, the end user appends its parsed data input to the request. The request is then submitted to the data store.

Standard Internet TCP/IP addressing conventions route the request to the proper server at the data store, which server is in communication with the data object store. The APL instructions ensure that the data store automatically households the parsed end user data input with the specified data store data input.

The result set generated by this householding process forms a new compressed data object, consisting of combined, householded data input from the end user and data store, and header information describing the combined result set. Optionally, the end user may specify additional data store logic to be executed on the combined data before a result is returned.

MULTIPLE DATA STORES

The GUI can access and manipulate header and logic information from any data store and/or vendor that has used the APL to store its data in the object form described above. An end user, therefore, can access header and logic information from multiple data stores and use the GUI to build a single request containing header and logic information from these various data stores.

In an exemplary method according to the invention, each data store receives a unique identification key. When the Merge process is executed, the identification key is embedded in the header information of each universal data object as unformatted data. Therefore, when a data store executes a Get Header request to extract header information, the data store identification key can be transferred with the header information to the network server, although it is not visible to or accessible by the data store, the end user, or any third party.

Because the data store identification key is stored with the header information (and any logic information made available by the data store), it is also automatically transferred to the client application when the end user accesses the header information remotely. The client application, therefore, can use the identification key to distinguish among header and logic information received from different third party sources and from the end user.

This distinction can be made tangible to the end user by representing header and logic information on the GUI in different colors or with a symbol used to identify the data store from which the information was accessed. Because the identification key is embedded in the information, it will also be included in any request that uses such information.

A completed request will be addressed to visit the data stores that have information included in the request header, to automatically access raw data and logic at each data store according to the APL instructions, and to return a result, without the necessity of having any special interface for different data stores. Thus, a single request can perform numerous data retrieval and data processing operations at numerous data stores.

For example, an end user might wish to household its own data with data stored at Data Store A to produce a result set for processing according to logic made available at Data Store B. This end user would electronically visit each data store to access the desired header and logic information. After accessing this information and integrating it on the GUI to build a customized request, the end user would attach its own data to the request.

Depending upon the request constructed by the end user, the process would use the identification key associated with the header and logic information to address the request to the appropriate data stores in the appropriate order. In the example given above, the process would automatically address the request to Data Store A for householding and data retrieval and then to Data Store B for logic execution. Upon arrival at Data Store A, the householding request would be automatically executed and compressed raw data from Data Store A would be appended to the compressed end user data that was attached to the request and a new, compressed object would be created with header information corresponding to the new, householded raw data. The entire request would then be forwarded to Data Store B, where the request would call Data Store B logic for execution on the entire compressed mass of householded data. The result set from this process would be formatted as specified by the end user and returned.

The invention includes logic to prevent the request from failing at any particular data store because it lacks necessary information or logic stored at another data store. In a method according to the invention, the request will avoid such a "deadly embrace" by travelling from one data store to another to retrieve and store information necessary to execute the request until it has retrieved enough information to actually execute according to its instructions. In other words, the system will not halt simply because the request needs more data or logic before it can finally execute the request.

REQUEST SECURITY

The exemplary embodiment of the invention includes compression and transmission processes that provide security for all outgoing request objects and incoming results. In the preferred embodiment of the invention, compression is dynamic so that each byte constituting header information and/or raw data is translated differently each time it is compressed, and identical bytes of header information and raw data may be represented differently throughout the same compressed object. Further, each request object is transmitted in separate compressed data blocks.

A data store will not be permitted to open a request or a part of a request until it has received all of the data blocks comprising the request and presented an identification key that matches information stored in the header. The identification key itself is dynamically compressed and disbursed among the separately transmitted data blocks, so that no individual data block has the information necessary to open the block. Dynamic compression renders unidentifiable even that portion of the identification key included with an individual block.

Upon the arrival of the request at the data store, the data store is able to access only a limited section of the header information transmitted with the data block, which section specifies the position of that block in the entire request. The data store will not be able to access additional header information or the raw data until it has received and assembled all of the pieces of the request. Thus, if a portion of the request is misdirected or intercepted, the contents of each compressed data block will be inaccessible.

Once the entire request is received by the data store, the data object is assembled. After the object is assembled, the data store is permitted to search another limited section of the header information for unformatted information that matches the data store identification key.

In the event that the data store does not find a match, the data object will not open and the instructions and raw data will remain inaccessible. In the event that the data store does find a match, the header information and raw data pertaining to that data store only will become accessible, and processing will begin according to the APL instructions.

A request that is being circulated to multiple data stores will allow each data store to access only that part of the header and raw data that is necessary to execute the request instructions at that data store. In the example given above, therefore, Data Store A would execute a householding request, but it would not access or identify the logic to be executed at Data Store B.

After the householding was completed, Data Store A would construct a compressed object with the householded Data Store A and end user data, create an appropriate header and send the new, compressed request object on to Data Store B.

Because Data Store B requires access to the entire mass of raw data in order to execute specified logic, it will be permitted to access all of the attached, householded raw data, including the data added at Data Store A.

Because the request contains logic that will instruct it to circulate among the different data stores gathering relevant information until a complete request can be executed, security will not prevent the execution of a multiple data store request, and a multiple data store request will not compromise the security of the data object.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s).

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components described with reference to the preferred embodiment(s), this is not meant to be an exhaustive treatment of all the possible equivalents, nor to limit the invention defined by the claims to any particular equivalent or combination thereof.

A person skilled in the art would realize that there may be other equivalent components presently known, or to be developed, which could be used within the spirit and scope of the invention defined by the claims.

What is claimed is:

1. A method of using execution tables, wherein a structural search is performed comprising:

analyzing all search patterns generated for a given input pattern and identifying the output table symbol for which an exact match is required most frequently in the same search pattern position;

prioritizing the search patterns identified in the previous step to eliminate at the beginning of the process the largest number of records that will not match the parsing table and continuing to prioritize search patterns using the same process until all search patterns are in order;

accessing input data according to the highest priority search pattern and determining whether the input data and parsing table, position determined by the highest priority search parameter, matches;

eliminating subsequent searches according to whether a match in the accessing step occurred and whether such a match is required in subsequent searches;

repeating accessing and eliminating steps until the input data matches the parsing table in relevant positions or until the search fails;

moving the matched data into a virtual memory table to retrieve input data, position determined by position of next search parameter, without losing the location of the matched data for the previous position, and storing the frequency of matches of input data and parsing table data, position determined by search parameter, in a virtual memory table.

2. The method of using execution tables according to claim 1, wherein a second execution table performs the input data matching search comprising:

analyzing only the search patterns from the virtual memory table to match data input to the parsing table (s); and matching the input data to the parsing table in order of the position and end user preferences, starting with the record fields that require an exact match and proceeding to fields in which the end user specified some tolerance data in data.

3. The method according to claim 2 wherein in the event that more than one field requires a match, the second execution table will examine the primary position first, followed by the secondary position.

4. The method of using execution tables according to claim 1 wherein there are two or more positions selected by an end user, comprising:

comparing the frequency of the primary position matches verses the frequency of secondary position matches; and beginning with the position value that matched the fewest records, comparing the primary position value to the primary position and the secondary position value to the secondary position to assure both values match for records moved into virtual memory by the execution tables.

5. The method of using execution tables according to claim 1, wherein after the first two positions are matched, any other required matching is performed only on the remaining records that were moved into virtual memory.

6. The method of using execution tables according to claim 1, wherein a third execution table matches the input data to the parsing table for those fields that the end user selected as allowing for error tolerance, comprising:

accessing the data input for the first search pattern position in the first remaining search pattern for which deviation is permissible;

retrieving the data value for this search pattern position;

matching the data value to the parsing table; and applying the fault tolerance logic as defined by the end user;

wherein a final, customized parsing search will contain:
  (i) a complete and standardized set of information matching the key parameters; and
  (ii) a complete and standardized set of information with the fault tolerance as defined by end user.

* * * * *